C. ANDRADE, Jr.
AUTOMATIC TRIP AND BRAKE DEVICE FOR WINDLASSES.
APPLICATION FILED DEC. 8, 1910.

988,428.

Patented Apr. 4, 1911.

4 SHEETS—SHEET 1.

WITNESSES:
David J. Walsh
Guy V. Hodges

INVENTOR
Cipriano Andrade Jr.

C. ANDRADE, Jr.
AUTOMATIC TRIP AND BRAKE DEVICE FOR WINDLASSES.
APPLICATION FILED DEC. 8, 1910.
988,428.
Patented Apr. 4, 1911.
4 SHEETS—SHEET 2.
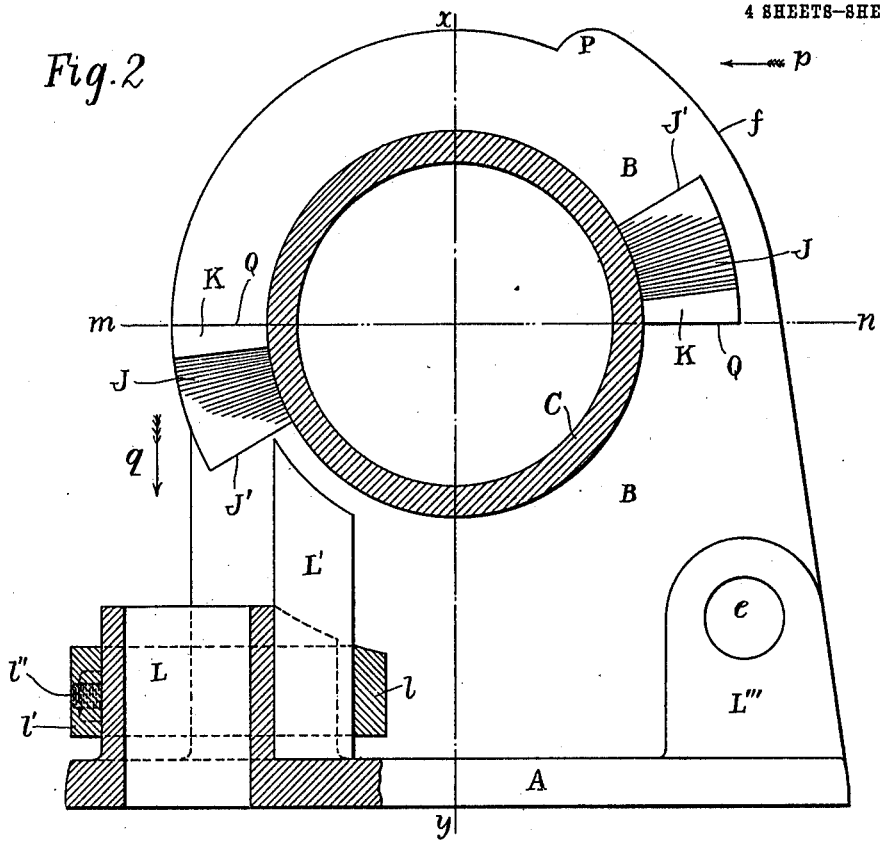
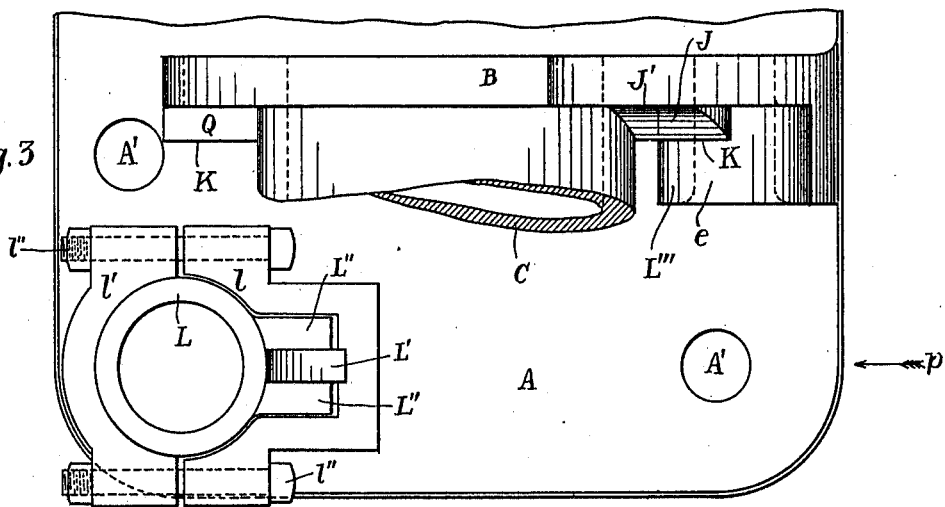
WITNESSES:
INVENTOR C. ANDRADE, Jr.
AUTOMATIC TRIP AND BRAKE DEVICE FOR WINDLASSES.
APPLICATION FILED DEC. 8, 1910.

988,428.

Patented Apr. 4, 1911.

4 SHEETS—SHEET 3.

WITNESSES:
David J. Walsh
Harry W. Hodges

INVENTOR
Cipriano Andrade Jr.

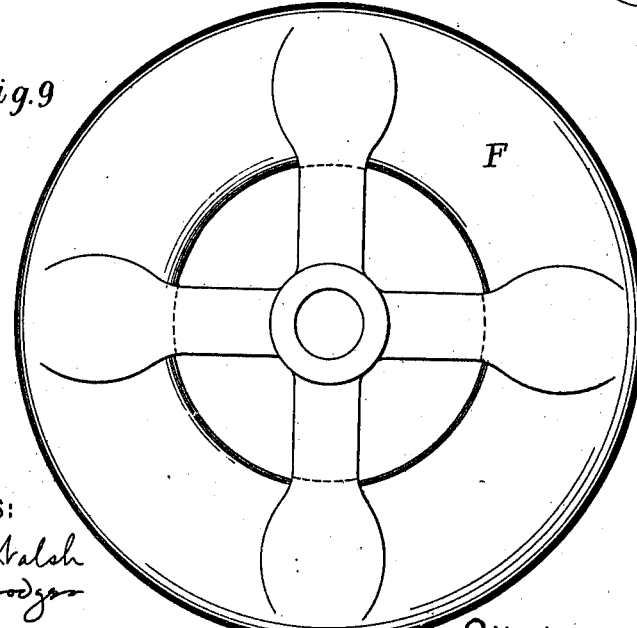

UNITED STATES PATENT OFFICE.

CIPRIANO ANDRADE, JR., OF NEW YORK, N. Y.

AUTOMATIC TRIP AND BRAKE DEVICE FOR WINDLASSES.

988,428.  Specification of Letters Patent.  Patented Apr. 4, 1911.

Application filed December 8, 1910. Serial No. 596,340.

*To all whom it may concern:*

Be it known that I, CIPRIANO ANDRADE, Jr., a citizen of the United States, residing at 328 West Eighty-fourth street, in the city of New York, in the county of New York and State of New York, have invented a new and useful Automatic Trip and Brake Device for Windlasses, of which the following is a specification.

Figure 1:
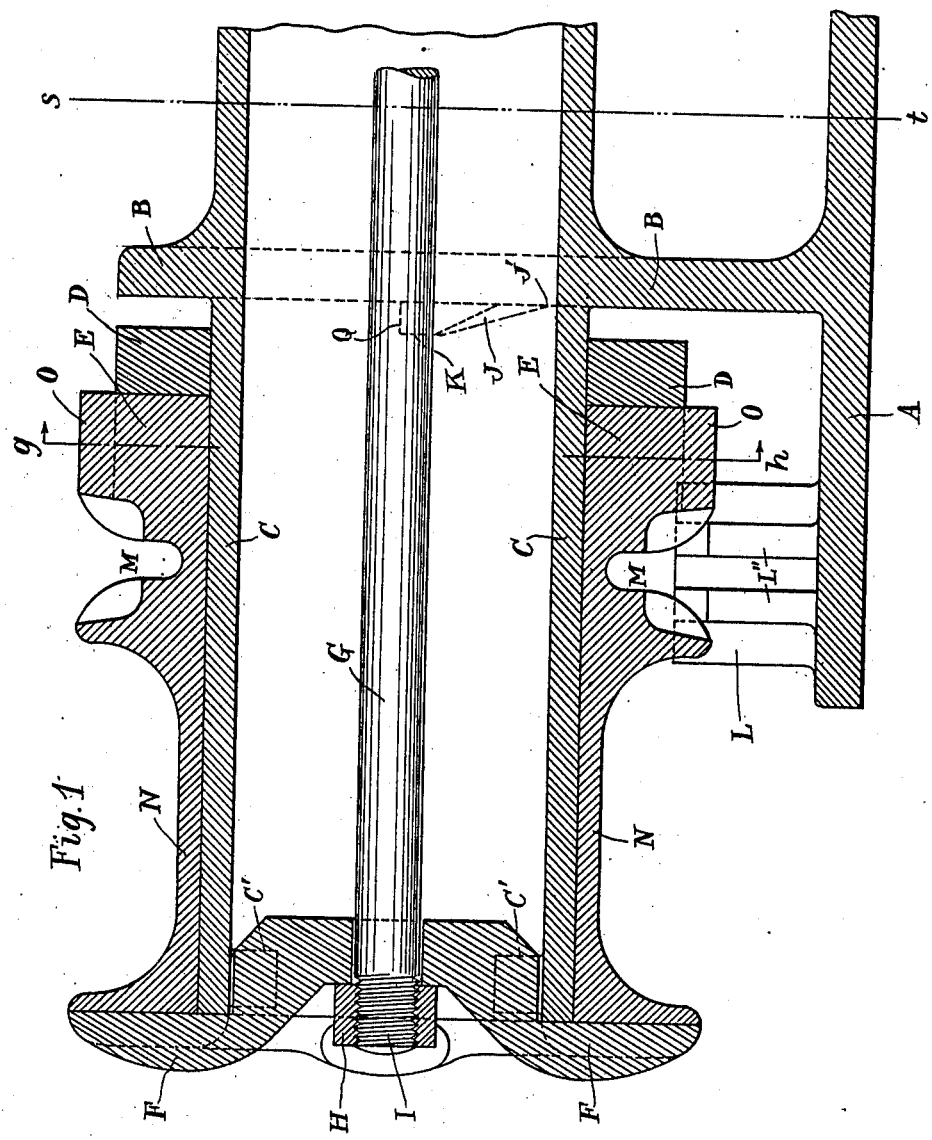
Figure 5:
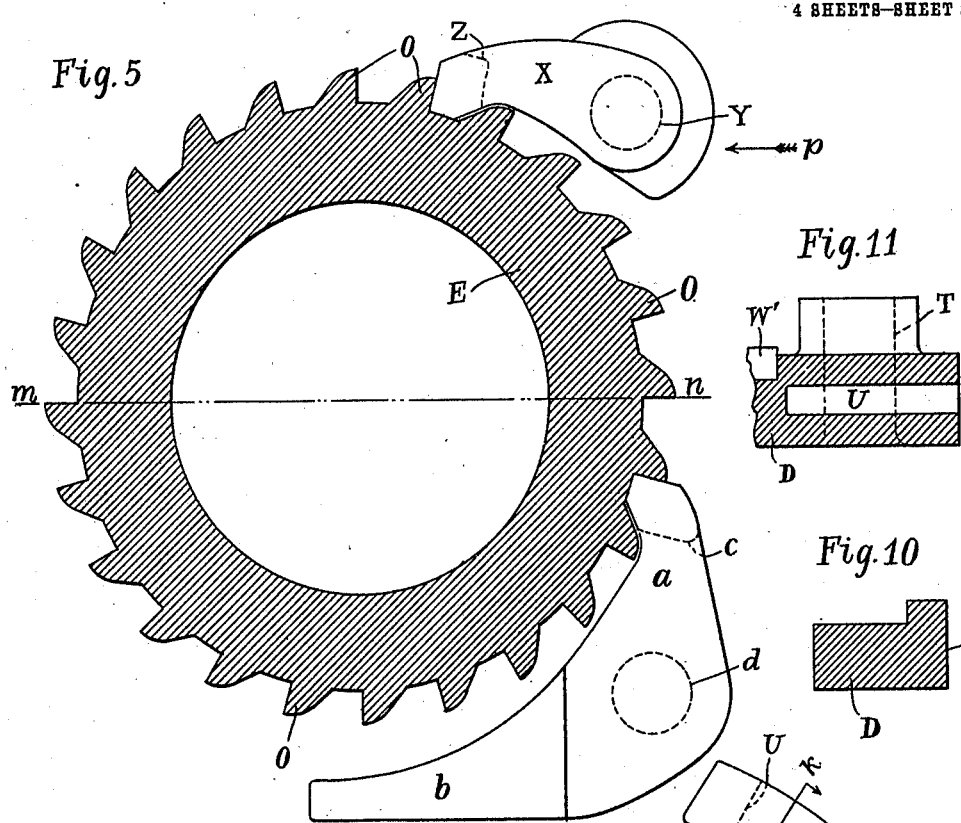
Figure 11:
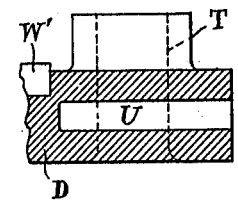
Figure 10:
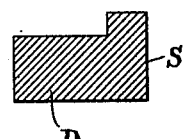
Figure 4:
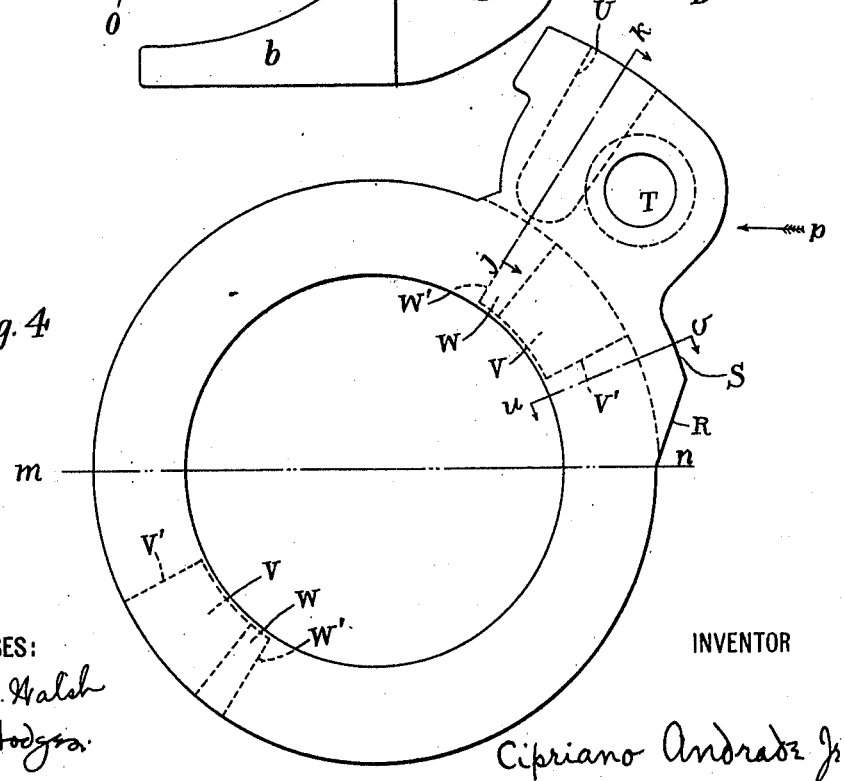

My invention relates to improvements in automatic trip and brake device for windlasses, and the objects of my invention are to provide a form of trip and brake for windlasses which shall be simple, positive, easy to handle, and operable by only one handle bar, without the necessity of a separate brake bar, and without the necessity of any separate operation to trip the pawls or brake the windlass. I attain these objects by the mechanism illustrated in the accompanying drawings, in which:

Figure 1 is a longitudinal section in elevation of my device, viewed from the bow of the boat, taken on the line $x$—$y$ (Fig. 2). It will be noted that horizontal windlasses are usually made double, *i. e.* with two heads, identical with one another in all respects, and therefore Fig. 1, to represent a double windlass, should be carried out symmetrically to line $s$—$t$. For the purpose of saving space, only the starboard side of the double windlass is shown in Fig. 1. Fig. 2 is an end elevation of my device looking inboard from the starboard side with the sheave removed. Fig. 3 is a plan view of the starboard half of my device with certain parts removed. Fig. 4 is an end elevation of the outer face of trip ring D looking inboard from the starboard side. Fig. 5 is a transverse section in elevation of the drum E, taken on line $g$—$h$ (Fig. 1), and showing the pawls X and $a$ in position, all viewed looking inboard from the starboard side. Fig. 6 is a plan view of the top face of heaving pawl X. Fig. 7 is a plan view of the top face of the holding pawl $a$. Fig. 8 is an end view in elevation of the outer end of sleeve C. Fig. 9 is an end view in elevation of the outer face of spider F. Fig. 10 is a detail section of trip ring D, on line $u$—$v$ (Fig. 4). Fig. 11 is a detail section of trip ring D, on line $j$—$k$ (Fig. 4). Fig. 12 is a diagrammatic view showing the functioning of the device at different positions of the handle bar. Figs. 2, 4, 5 and 12 are all shown in the same position relative to horizontal reference line $m$—$n$.

Similar letters refer to similar parts throughout the several views.

A is a bed plate.

B is a web plate perpendicular with A and integral therewith.

C is a sleeve perpendicular to web plate B and integral therewith.

D is a trip ring free to revolve about sleeve C as an axis.

E is a drum with ratchet teeth O, all revolving freely about sleeve C as an axis.

M is a wildcat integral with drum E.

F is a spider stationary with reference to sleeve C.

G is a tie rod with thread I engaged by nut H, whose function is to hold spider F rigidly to the end of sleeve C.

J are wedge surfaces integral with web plate B, with their lower edges J' away from plane surfaces K, and flush with the face of web plate B; and with their upper edges adjacent to plane surfaces K. Plane surfaces K are parallel with the surface of web plate B, and are on the level of the upper edges of wedge surfaces J.

Q are the back faces of wedging members J K. Faces Q are perpendicular to the face of web plate B.

L is a chain pipe integral with bed plate A, its function being to allow the chain to run down from the wildcat M into the chain locker below deck.

L' is a tongue fixed with reference to bed plate A and extending to the bottom of the groove in the wildcat M, for the purpose of disengaging the chain, if it should become jammed in wildcat M.

N is a barrel integral with E and M.

L''' is a lug integral with web plate B, having a hole $e$ perpendicular to web plate B. Hole $e$ takes pin $d$ in holding pawl $a$, and said pawl rotates to a limited extent about pin $d$ as an axis. Pin $d$ has a thread $d'$ to take a nut $d''$ on the back of web plate B. This nut should preferably have a washer $a'$ under it and be fastened with a pin $d'''$.

P is a cam surface on the periphery of web plate B; its function is to engage trip lug Z of heaving pawl X and thereby trip said pawl.

f is a peripheral surface adjoining the outer edge of cam surface P and concentric with sleeve C.

Y is a pin integral with heaving pawl X, and rotating in hole T in trip ring D.

Y' is a threaded portion on pin Y, to engage a nut Y'' perferably with washer X' and pin X''.

R is a cam surface on the periphery of trip ring D; its function is to engage trip lug c of holding pawl a, and thereby trip said pawl.

S is a peripheral surface adjoining the outer edge of cam surface R and concentric with the periphery of trip ring D and with sleeve C.

U is a handle bar socket, into which a handle bar is inserted, whereby trip ring D may be rotated about sleeve C as an axis.

V are wedge surfaces integral with trip-ring D, and lying on the side of D adjacent to web plate B. The lower edges V' of wedge surfaces V are away from plane surfaces W, and are flush with the face of trip ring D; the upper edges of wedges V are flush with plane surfaces W. Plane surfaces W are parallel with the face of trip ring D.

W' are the back faces of wedging members V V' W. Faces W' are perpendicular to the back face of trip ring D. Wedge members J' J K and V V' W are so placed on web plate B and trip ring D respectively that, at a certain point of rotation of ring D about sleeve C, the wedge members J J' K and V V' W will register with one another. The plane surfaces K are in rotative contact with the back face of trip ring D, and the plane surfaces W are in rotative contact with the front face of web plate B.

b is a counterweight on holding pawl a, its function being to make pawl a engage in ratchet teeth O.

A' are bolt holes in bed plate A to fasten the windlass to the deck; l and l' are clamps to hold tongue L' in position in jaws L'', l'' are bolts to hold clamps l and l' together.

C' are lugs on the inside end of sleeve C, their function being to engage the arms of spider F, and hold spider F motionless with reference to sleeve C.

p is an arrow indicating the direction from which the chain comes when heaving in.

q is an arrow indicating the direction in which the chain is discharged when heaving in.

The operation of my device is as follows: Suppose that the trip ring D and pawls X and a and drum E are all in the relative position of rotation shown in Figs. 2, 4 and 5. At this point the handle bar will be in the position 13 of Fig. 12. If now, the handle bar is drawn back from 13 toward m (Fig. 12), heaving pawl X engages ratchet O and rotates the member E M N, thus drawing in chain from p and discharging it toward q. This backward motion of the handle bar may be continued until faces W' come in contact with faces Q. This amounts to an angular movement of 123 degrees in the particular arrangement of parts here shown. The handle bar may then be thrown forward from m to 13 (Fig. 12) during which operation, holding pawl a engages a ratchet O and holds member E M N motionless, while heaving pawl X rides back over ratchets O. Suppose now that it is desired to trip the pawls X and a. The handle bar is thrown forward from the position 13 toward the position 14 (Fig. 12). As soon as this is done, cam P engages lug Z and trips heaving pawl X, while at the same time, cam R engages lug c and trips holding pawl a. (It will be noted that I have so proportioned my device that pawl X always trips before pawl a, and on the return motion from 14 to 13 (Fig. 12), pawl a always engages before pawl X. This is a useful detail of design, as it always leaves the holding strain on pawl a, and never leaves it entirely on pawl X). When the handle bar reaches the position 14 (Fig. 12), as both pawls X and a are now tripped, the chain at once runs out against the direction p. When it is desired to check the outward run of the chain, the handle bar is pushed from 14 to 15 (Fig. 12) whereupon the wedge surfaces J and V come into engagement and force trip ring D away from web plate B, whereupon trip ring D presses against member M E N, which in turn presses against spider F, and the resulting friction causes a diminution or total cessation of the movement of member M E N, according to the degree of pressure on the handle bar. When the chain has been brought to a stop as just indicated, the handle bar should be jerked sharply from 15 back to 13 (Fig. 12). The reason why this motion should be quick, is so that pawl a may have a chance to engage before member M E N has acquired any considerable speed of rotation against the direction p; in which latter case there would be danger of stripping ratchet teeth O. This precaution just mentioned must be observed with all windlasses generally, and is not peculiar to my windlass; because it is never good practice with any style of windlass to set the pawls into engagement while the chain is running out at a rapid rate. As soon as the handle bar is back to position 13, chain may be again taken in as previously described. If a heavy gale is blowing, making it difficult to heave in the chain, trip lug Z may be lifted with the fingers and the handle bar brought back to the position m (Fig. 12); in which position the handle bar and socket U should always be left when riding at anchor.

I have shown my improvements as applied to a windlass of the horizontal type, but exactly the same arrangement of parts would be operative if the windlass were set vertical, making web plate B set flat on deck. The only change necessary would be to put springs back of pawls X and *a* to make them engage in ratchets O, instead of using the force of gravity for that purpose, as shown in the present drawings.

Where chain only is to be used, the smooth barrel N may be eliminated, thus making the device more compact.

I claim:

1. In windlasses in combination: a web plate rigid with the vessel's deck, said web plate having wedges on its face nearest the trip ring hereinafter mentioned, and having also a cam adapted for effective engagement with the trip lug on the heaving pawl hereinafter mentioned; a sleeve perpendicular to the web plate and fixed with reference thereto; a drum rotating about said sleeve as an axis, said drum having ratchet teeth on its periphery; a holding pawl fixed with reference to the web plate, and engaging said ratchet teeth, said holding pawl having a trip lug; a trip ring disposed between the end of the drum and the face of the web plate, said trip ring being rotatable about said sleeve, said trip ring carrying on one of its faces wedges adapted for effective rotary engagement with the wedges on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; a member at the end of the sleeve farthest from the web plate, said member being fixed with reference to said sleeve, and being adapted to resist any motion of the drum away from the web plate; means for imparting a reciprocating motion of rotation to said trip ring.

2. In windlasses in combination: a web plate rigid with the vessel's deck, said web plate having a cam adapted for effective engagement with the trip lug on the heaving pawl hereinafter mentioned; a sleeve perpendicular to the web plate and fixed with reference thereto; a drum rotating about said sleeve as an axis, said drum having ratchet teeth on its periphery; a holding pawl fixed with reference to the web plate, and engaging said ratchet teeth, said holding pawl having a trip lug; a trip ring disposed between the end of the drum and the face of the web plate, said trip ring being rotatable about said sleeve, said trip ring carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; means for imparting a reciprocating motion of rotation to said trip ring.

3. In windlasses in combination; a web plate rigid with the vessel's deck, said web plate having wedges on its face nearest the trip ring hereinafter mentioned, and having also a cam adapted for effective engagement with the trip lug on the heaving pawl hereinafter mentioned; a sleeve perpendicular to the web plate and fixed with reference thereto; a drum rotating about said sleeve as an axis, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable about said sleeve, said trip ring carrying on one of its faces wedges adapted for effective rotary engagement with the wedges on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; a member at the end of the sleeve farthest from the web plate, said member being fixed with reference to said sleeve, and being adapted to resist any motion of the drum away from the web plate; means for imparting a reciprocating motion of rotation to said trip ring.

4. In windlasses in combination: a web plate rigid with the vessel's deck, said web plate having a cam adapted for effective engagement with the trip lug on the heaving pawl hereinafter mentioned; a sleeve perpendicular to the web plate and fixed with reference thereto; a drum rotating about said sleeve as an axis, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable about said sleeve, said trip ring carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; means for imparting a reciprocating motion of rotation to said trip ring.

5. In windlasses in combination: a web plate rigid with the vessel's deck, said web plate having a wedge on its face nearest the trip ring hereinafter mentioned, and having also a cam adapted for effective engagement with the trip lug on the heaving pawl hereinafter mentioned; a sleeve perpendicular to the web plate and fixed with reference thereto; a drum rotating about said sleeve as an axis, said drum having ratchet teeth; a holding pawl fixed with reference to the web plate, and engaging said ratchet teeth, said holding pawl having a trip lug; a trip ring disposed between the end of the drum and the face of the web plate, said trip ring being rotatable about said sleeve, said trip ring carrying on one of its faces a wedge adapted for effective rotary engagement with the wedge on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; a member at the end of the sleeve farthest from the web plate, said member being fixed with reference to said sleeve, and being adapted to resist any motion of the drum away from the web plate; means for imparting a reciprocating motion of rotation to said trip ring.

6. In windlasses in combination: a web plate rigid with the vessel's deck, said web plate having a wedge on its face nearest the trip ring hereinafter mentioned, and having also a cam adapted for effective engagement with the trip lug on the heaving pawl hereinafter mentioned; a sleeve perpendicular to the web plate and fixed with reference thereto; a drum rotating about said sleeve as an axis, said drum having ratchet teeth on its periphery; a holding pawl fixed with reference to the web plate, and engaging said ratchet teeth, said holding pawl having a trip lug; a trip ring disposed between the end of the drum and the face of the web plate, said trip ring being rotatable about said sleeve, said trip ring carrying on one of its faces a wedge adapted for effective rotary engagement with the wedge on the face of the web plate, whereby said trip ring may be forced away from said web plate and against the end of said drum, said trip ring also carrying on itself a cam designed for effective engagement with the trip lug on the holding pawl, whereby said holding pawl may be tripped; a heaving pawl on said trip ring, said heaving pawl engaging said ratchet teeth, said heaving pawl having a trip lug, whereby said pawl may be brought into effective tripping engagement with the cam on the web plate; a member at the end of the sleeve farthest from the web plate, said member being fixed with reference to said sleeve, and being adapted to resist any motion of the drum away from the web plate; means for imparting a reciprocating motion of rotation to said trip ring.

CIPRIANO ANDRADE, Jr.

Witnesses:
    ARTHUR C. JOHNSON,
    ADOLPH T. VIDDER.

---

Copies of this patent may be obtained for five cents each, by addressing the "Commissioner of Patents Washington, D. C."